United States Patent
Kirovski

(10) Patent No.: US 8,265,270 B2
(45) Date of Patent: Sep. 11, 2012

(54) UTILIZING CRYPTOGRAPHIC KEYS AND ONLINE SERVICES TO SECURE DEVICES

(75) Inventor: Darko Kirovski, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 885 days.

(21) Appl. No.: 11/951,021

(22) Filed: Dec. 5, 2007

(65) Prior Publication Data

US 2009/0147949 A1 Jun. 11, 2009

(51) Int. Cl.
*H04L 9/00* (2006.01)
(52) U.S. Cl. ................................................ 380/44
(58) Field of Classification Search .................. 380/44
See application file for complete search history.

(56) References Cited

U.S. PATENT DOCUMENTS

| | | | | |
|---|---|---|---|---|
| 4,954,982 | A * | 9/1990 | Tateishi et al. | 711/164 |
| 5,677,953 | A | 10/1997 | Dolphin | |
| 5,857,021 | A | 1/1999 | Kataoka et al. | |
| 6,578,122 | B2 * | 6/2003 | Beukema et al. | 711/163 |
| 6,807,277 | B1 * | 10/2004 | Doonan et al. | 380/281 |
| 7,519,184 | B2 * | 4/2009 | Kayashima et al. | 380/283 |
| 2002/0044663 | A1 | 4/2002 | King et al. | 380/284 |
| 2002/0180582 | A1 * | 12/2002 | Nielsen | 340/5.6 |
| 2003/0026431 | A1 * | 2/2003 | Hammersmith | 380/277 |
| 2005/0033959 | A1 | 2/2005 | Zheng et al. | |
| 2005/0066199 | A1 * | 3/2005 | Lin | 713/201 |
| 2005/0089166 | A1 | 4/2005 | Chen | |
| 2005/0210236 | A1 | 9/2005 | Lee et al. | |
| 2006/0107062 | A1 * | 5/2006 | Fauthoux | 713/182 |
| 2007/0067618 | A1 | 3/2007 | Sandhu et al. | |
| 2007/0177740 | A1 * | 8/2007 | Nakajima | 380/277 |
| 2007/0186099 | A1 | 8/2007 | Beck et al. | |
| 2008/0147892 | A1 * | 6/2008 | Carlson et al. | 710/5 |
| 2008/0279382 | A1 * | 11/2008 | Chen et al. | 380/277 |
| 2010/0054465 | A1 * | 3/2010 | Asano et al. | 380/46 |

OTHER PUBLICATIONS

USB vault: Rock Solid Encryption http://www.usbvault.com/. Last accessed Sep. 6, 2007, 2 pages.
SafeGuard Device Encryption http://www.utimaco.co.uk/C12570CB0047B0D2/vwContentByKey/W26KHGZ9576OBELEN/$FILE/sgn_de_en.pdf. Last accessed Sep. 6, 2007, 2 pages.
Stealth MXP: Secure Digital Identity and Encrypted Storage http://www.envoydata.com/datasheets/StealthMXP_Feb_06.pdf. Last accessed Sep. 6, 2007, 2 pages.
Rohos Mini Drive http://www.rohos.com/. Last accessed Sep. 6, 2007, 2 pages.
John Cox. Portable Storage Devices Gain Data-Encryption Controls, Network World, Aug. 7, 2007 http://www.networkworld.com/news/2007/080707-credant-portable-storage-encryption.html. Last accessed Sep. 6, 2007, 3 pages.

* cited by examiner

*Primary Examiner* — Kambiz Zand
*Assistant Examiner* — Teshome Hailu
(74) *Attorney, Agent, or Firm* — Lee & Hayes, PLLC

(57) ABSTRACT

The claimed subject matter in accordance with an aspect provides systems and/or methods that generates, allocates, or utilizes strong symmetric cryptographic keys to secure storage devices. The system can include components that determine whether a storage device with an associated credential cache has been affiliated with the system. The system extracts authentication information included within the credential cache and establishes communications with a web service that utilizes the authentication information to generate and return a set strong symmetric cryptographic keys to the system. The system employs one of the set of strong symmetric cryptographic keys to encrypt or decrypt the storage device to make content persisted on the storage device available and thereafter removes the distributed set of strong symmetric cryptographic keys from the system.

20 Claims, 9 Drawing Sheets

UTILIZING CRYPTOGRAPHIC KEYS AND ONLINE SERVICES TO SECURE DEVICES

BACKGROUND

Computer technology can influence various aspects of data storage, such as encryption of data persisted on storage devices. A variety of protection schemes can be implemented to increase the security of, and limit access to, content on such storage devices. For instance, data can be encrypted in a manner that requires a key to unlock data. Without such a key, it can be virtually impossible to access data, and breaking encryption can take countless hours.

Storage systems, and more particularly portable storage systems, such as Universal Serial Bus (USB) devices, are typically protected using either password-generated encryption keys or hardware implemented tamper resistant key-banks and cryptographic co-processors. Nevertheless, these current protection mechanisms are generally inadequate for providing strong protection and limiting access, as password-generated encryption keys can easily be revealed through dictionary attacks, and utilization of hardware implemented tamper resistant key-banks and cryptographic co-processors can be expensive and prone to reverse engineering and timing and power analysis attacks.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter in accordance with an aspect provides systems that facilitate and effectuate at least one of generation, allocation, or utilization of strong cryptographic keys to secure portable storage devices. The system ascertains whether or not a device has been acquired, locates, if available, a credential cache associated with the detected device and extracts a username and password couplet persisted therein. The system utilizes the username and password couplet to initiate communications with a server (or a web service executing on the server) wherein the server employs the username and password couplet to generate and/or allocate and disseminate a set of symmetric cryptographic keys related to the username and password couplet. Prior to disseminating the set of symmetric cryptographic keys, the server stores a version of the keys in association with the username and password couplet, for example. The system uses at least one key from the set of distributed symmetric cryptographic keys, for instance, to either encrypt or decrypt the detected device (or portions thereof) and makes content included thereon accessible for use. Once either encryption or decryption of the detected device has been accomplished, the system securely discards the set of distributed symmetric cryptographic keys, including the key employed to encrypt or decrypt the detected device.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
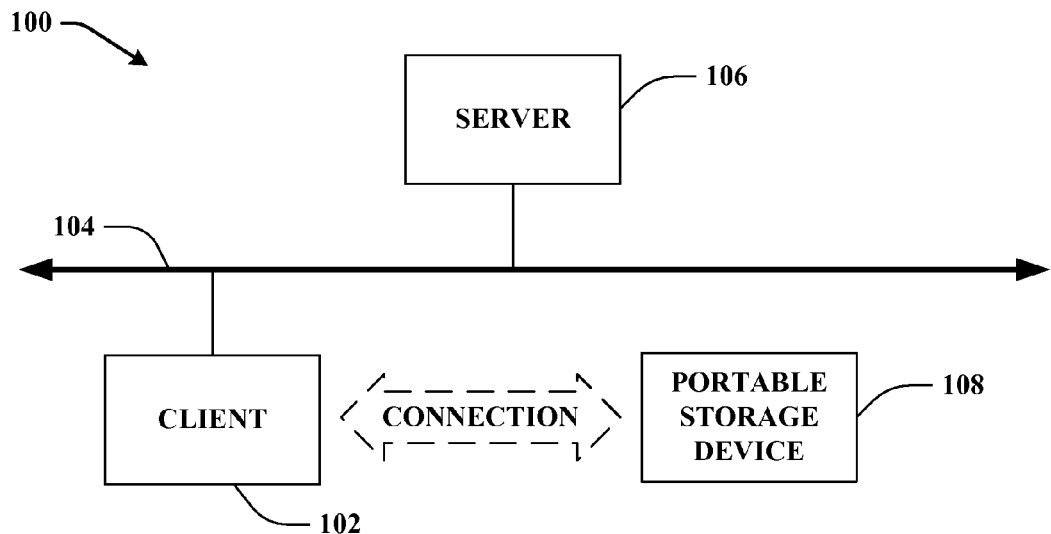
FIG. 1 illustrates a machine-implemented system that facilitates and effectuates generation and/or utilization of strong cryptographic keys to secure portable storage devices in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

FIG. 1 illustrates a system 100 that facilitates and effectuates generation and/or utilization of strong cryptographic keys to secure portable storage devices. System 100 can include client 102 that can be in continuous and operative, or sporadic and/or intermittent, communication with server 106 via network topology 104. Client 102 can be implemented entirely in hardware and/or a combination of hardware and/or software in execution. Further, client 102 can be incorporated within and/or associated with other compatible components, such as devices and/or appliances that can include processors (e.g., desktop computers, laptop computers, notebook computers, cell phones, smart phones, personal digital assistants, multimedia Internet enabled mobile phones, multimedia players, and the like). Additionally, client 102 can receive or be in reception of portable storage device 108 (e.g., client 102 can be adapted or configured to accept one or more portable storage devices 108).

Network topology 104 can include any viable communication and/or broadcast technology, for example, wired and/or wireless modalities and/or technologies can be utilized to effectuate the claimed subject matter. Moreover, network topology 104 can include utilization of Personal Area Networks (PANs), Local Area Networks (LANs), Campus Area Networks (CANs), Metropolitan Area Networks (MANs), extranets, intranets, the Internet, Wide Area Networks (WANs)—both centralized and distribution—and/or any combination, permutation, and/or aggregation thereof.

Server 106, like client 102, can be implemented entirely in hardware and/or as a combination of hardware and/or software in execution. Further, server 106 can be any type of machine that includes a processor and is capable of effective communication with network topology 104. Illustrative machines that can comprise server 106 can include desktop computers, server class computing devices, cell phones, smart phones, laptop computers, notebook computers, Tablet PCs, consumer and/or industrial devices and/or appliances, hand-held devices, personal digital assistants, multimedia Internet mobile phones, and the like.

Portable storage device 108 can include flash memory devices and/or any hand-held device that includes flash memory such as Personal Digital Assistants (PDAs), laptop computers, cell phones, smart phones, notebook computers, Tablet PCs, consumer and/or industrial devices and/or appliances, multimedia Internet mobile phones, and the like, for example. Additionally, portable storage device 108 can also include non-portable storage devices, both remote and/or locally confederated with client 102 and/or server 106.

In accordance with an aspect of the claimed subject matter, system 100 can operate, without limitation, in the following manner. Portable storage device 108 can be associated with client 102. For example, in the case of USB flash memory the memory can be plugged into an available and appropriate USB slot, at which point client 102 can acknowledge or recognize the fact that USB flash memory has been affiliated with it. At this point an individual utilizing client 102 can establish a session on server 106. For instance, the individual can open a password-protected account with a web service executing on server 106. Server 106 can in turn generate a set of distinct strong encryption keys private to the individual's account and thereafter communicate the generated set of distinct strong encryption keys to the individual that initiated the session on client 102. The individual situated at client 102 can then utilize one or more keys from the generated set of distinct strong encryption keys to encrypt the content (or portions thereof) of portable storage device 108. Once encryption of the content of portable storage device 108 has been completed, client 102 can securely discard the key utilized. Conversely, content (or portions thereof) can be decrypted in a similar fashion, where the individual can establish a session (e.g., via client 102) with server 106. Once a session on server 106 has been established, server 106 can download the distinct strong encryption key set required to decrypt the encrypted content to client 102. Once content has been decrypted, the key set can be discarded by, and from, client 102.

In accordance with a further aspect of the claimed subject matter, and in a similar manner as described above, portable storage device 108 can be confederated with client 102 after which an individual employing client 102 can establish a session with server 106. For example, the individual utilizing client 102 to establish a session with server 106 can open a password-protected account where the password can be a traditional text and password, an alternative type of password such as a click password, or a password p strengthened with a random string r stored on portable storage device 108. In the latter case, the actual password utilized to access server 106 can be $p \otimes r$. In this way, large scale dictionary attacks can be circumscribed where usernames are assumed. A further preventative action that can improve robustness to large scale dictionary attacks can be utilization of a human interactive proof in addition to a randomized password while establishing a session between client 102 and server 106. Server 106 can then allocate a set of distinct symmetric cryptographic keys for the individual to use to encrypt and/or decrypt content on portable storage device 108. The cardinality of the set of distinct symmetric cryptographic keys can be adjusted on demand. For example, if the Advanced Encryption Standard (AES) is used as an encryption tool, keys of length $2^7$- or $2^8$-bits (e.g., 128- or 256-bits) can be practical for most applications. Nevertheless, as will be appreciated by those cognizant in this field of endeavor, keys of length greater or less than $2^7$- or $2^8$-bits can find equal applicability. Once the individual has established a session with server 106 a thin client can be installed on portable storage device 108. The purpose of the thin client can be to manage the encrypted content as well as download keys from server 106 in an authenticated manner. Typically, the thin client should authenticate itself to server 106, download encryption keys from server 106, undertake or perform encryption or decryption of data on storage media associated with client 102 (e.g., portable storage device 108), and once encryption or decryption of data has completed satisfactorily, the thin client can destroy the key on the local computing platform (e.g., client 102).

In this manner, portable storage device 108, or for that matter any storage device (e.g., local attached storage devices and/or remote non-portable storage devices), affiliated with client 102 can be encrypted and/or decrypted, and protected using strong cryptographic keys. If portable storage device 108 is stolen or lost, the device can only be decrypted by knowing the username of the account holder and guessing the password of the account holder correctly within K allowable trials. Generally, server 106 should disable access to the account where more than K unsuccessful logon trials are attempted. On a global scale, even though an adversary can guess accurately many usernames associated with server 106, it generally can be difficult to launch a dictionary attack without access to portable storage device 108.

Figure 2:
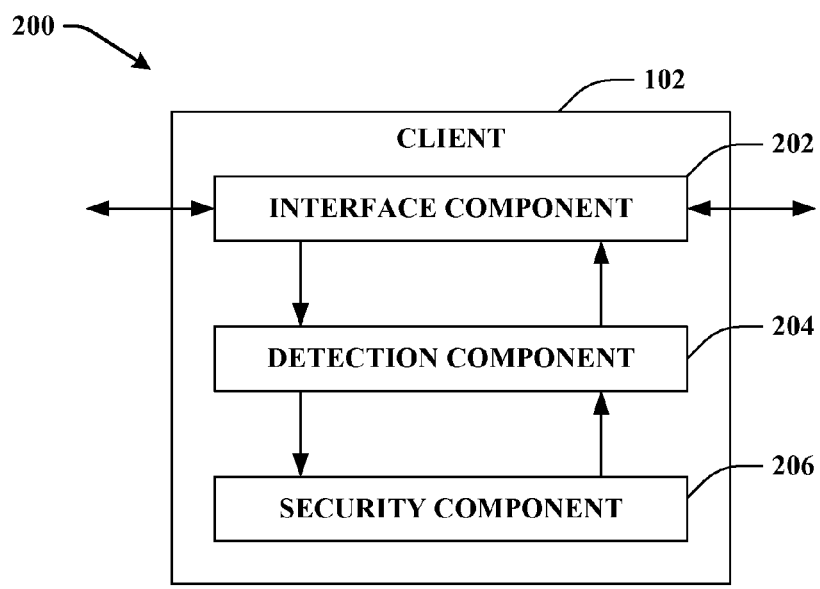
FIG. 2 provides a more detailed depiction of an illustrative client that facilitates and effectuates generation and/or utilization of strong cryptographic keys to secure portable storage devices in accordance with an aspect of the claimed subject matter.

FIG. 2 provides further illustration 200 of client 102 in accordance with an aspect of the claimed subject matter. Client 102 as depicted can include interface component 202 (hereinafter referred to as "interface 202") that can be in continuous and/or intermittent communication with server 106 via network topology 104. Client 102 can also include detection component 204 that can continuously monitor and detect the presence or absence of portable storage device 108. Client 102 can further include security component 206 that can manage the encryption and/or decryption of content persisted on portable storage media as well as download keys from server 106 in an authenticated manner.

Interface 202 can receive and transmit data from, and to, a multitude of sources, such as, for example, data associated with user names and passwords, sets of encryption and/or decryption keys, client applications, services, users, clients, devices, and/or entities involved with a particular transaction, portions of transactions, and thereafter convey the received information to detection component 204 and/or security component 206 for subsequent utilization and analysis. To facilitate its ends, interface 202 can provide various adapters, connectors, channels, communication pathways, etc. to integrate the various components included in system 200 into virtually any operating system and/or database system and/or with one another. Additionally and/or alternatively, interface 202 can provide various adapters, connectors, channels, communication modalities, and the like, that can provide for interaction with various components that can comprise system 200, and/or any other component (external and/or internal), data, and the like, associated with system 200.

Detection component 204 continuously monitors and detects the presence or absence of portable storage device 108. When a portable storage device 108 is detected as having been added to, or removed from, client 102, detection component can notify security component 206 of this fact.

Security component 206 manages the encryption and/or decryption of content persisted on portable storage media 108 as well as downloads keys from server 106 in an authenticated manner (e.g., using an authenticated communication session such as Transport Layer Security (TLS) or Secure Sockets Layer (SSL)). More particularly, security component 206, when a portable storage device 108 is first detected by detection component 204 (e.g., the first time that a device is associated with a client), can require the individual that associated the device with the client to establish, if one has not already been established, a password-protected account with server 106 wherein the individual can utilize a traditional text and password, an alternative type of password such as a click password, or a password p strengthened with a random string r. Once the password-protected account has been established security component 206 can persist the password on the detected device (e.g., in a credential cache associated with the detected device). Security component 206 can thereafter utilize such persisted password and/or credential information when the detected device is subsequently associated with client 102 in order to automatically communicate with server 106 and retrieve or receive key information necessary to encrypt and/or decrypt the detected device. Where the detected device (or portions thereof) has never been subject to encryption, security component 206 can utilize key information provided by server 106 to encrypt data on the detected device, and once encryption of the data has been completed satisfactorily, security component 206 can discard or destroy the key in a secure manner such that client 102 has no knowledge of the key that was used to encrypt the data on the detected device. Where, on the other hand, the detected device (or portions thereof) have previously be subjected to encryption, security component 206 can employ the persisted password and/or other credential information to establish communications with server 106 to obtain or solicit the set of distinct strong encryption keys necessary to decrypt the encrypted content on the detected device. Once the content has been decrypted, security component can facilitate and effectuate the secure disposal of the set of keys from client 102.

Figure 3:
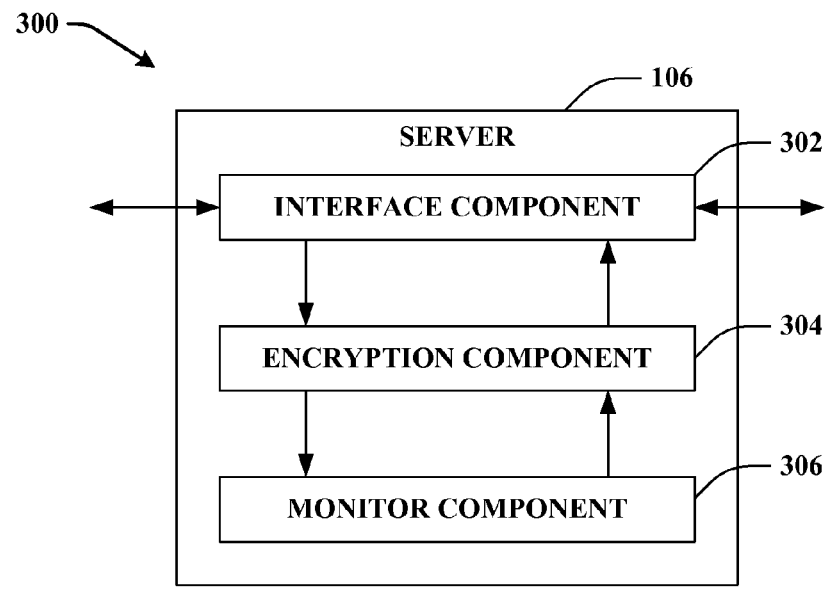
FIG. 3 provides a more detailed depiction of an illustrative server that facilitates and effectuates generation, allocation and/or utilization of strong cryptographic keys to secure portable storage devices in accordance with an aspect of the claimed subject matter.

FIG. 3 provides further illustration 300 of server 106 in accordance with an aspect of the claimed subject matter. Server 106 can include interface component 302 (hereinafter referred to as "interface 302") that can be in continuous and/or intermittent communication with client 102 via network topology 104. Since the functionality of interface 302 can be substantially similar to that of interface 202, as discussed supra in the context of FIG. 2, for the sake of brevity, a more comprehensive exposition of interface 302 has been omitted.

Server 106 can also include encryption component 304 that generates and disseminates a set of distinct symmetric cryptographic keys in response to a request received from client 106. The cardinality of the set of generated and/or disseminated keys can be adjusted on demand. For instance, where encryption component 304 utilizes the Advanced Encryption Standard (AES) keys of length 128- or 256-bits would typically suffice for most applications. Encryption component 304 can utilize any encryption tool currently available to generate or allocate the set of symmetric cryptographic keys. Illustrative cryptographic tools can include variants on the Data Encryption Standard (DES) block cipher, such as Triple DES, DES-X, RC-5, RC-6, Skipjack, stream ciphers (e.g., RC-4), cryptographic hash functions (e.g., SHA-1, SHA-224, SHA-256, SHA-384, SHA-512), and the like.

Server 106 in addition can include monitor component 306 that can keep track of the number of times that the password of an account holder is unsuccessfully entered. For example, where an encrypted device is lost, monitor component 306 can disable access to the account where more than K unsuccessful login trials are attempted, where K is an integer greater than or equal 1. Thus, if an encrypted device is lost or stolen, such a device can only be decrypted by knowing the username of the account holder and correctly guessing the password of the account holder within the allotted K allowable attempts.

In accordance with an aspect of the claimed subject matter, server 106 can utilize zero-knowledge proofs or zero-knowledge protocols, such as zero-knowledge password proofs, to effectuate secure communications between itself and client 102. Zero-knowledge password proofs are interactive techniques where client 102 needs to prove to server 106 that it (e.g., client 102) knows the password without revealing anything other than the fact that it knows the password to server 106, for example.

Figure 4:
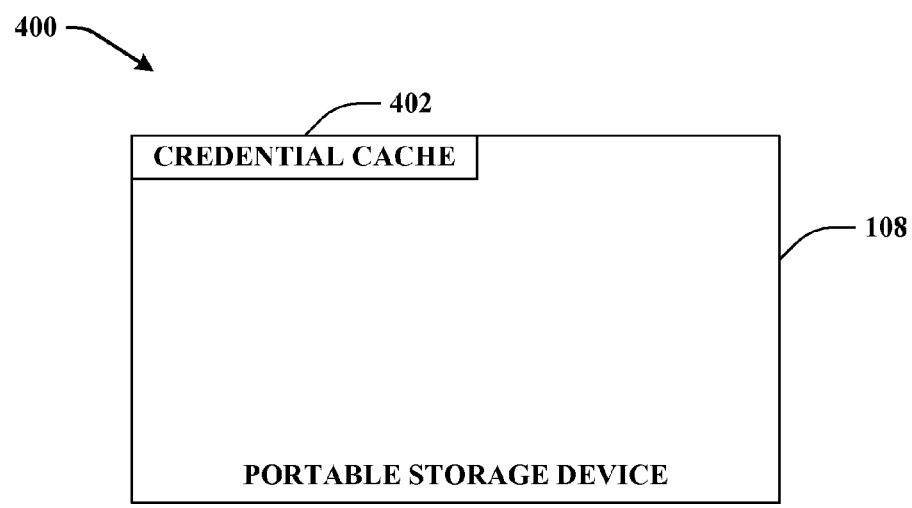
FIG. 4 provides a more detailed depiction of an illustrative portable storage device in accordance with an aspect of the claimed subject mater.

FIG. 4 provides illustration 400 of portable storage device 108 in accordance with an aspect of the claimed subject matter. As depicted storage device 108 can include a credential cache region 402 where password and/or credential can be persisted. Password and/or credential information when stored in credential cache 402 can be utilized to initiate a session with server 106 in order to unlock or decrypt the contents of previously encrypted portable storage device 108. Conversely, information persisted in credential cache 402, in conjunction with a session established by a user on server 106 and appropriately obtained encryption/decryption keys can be employed to encrypt the contents (or portions thereof) of portable storage device 108.

Figure 5:
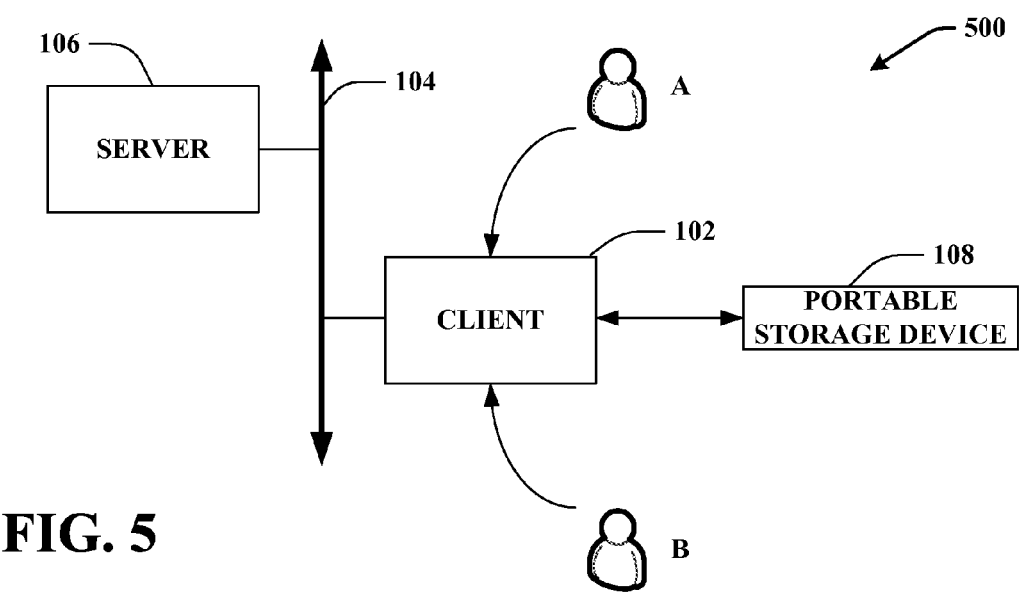
FIG. 5 provides a further illustration of a system that facilitates and effectuates generation and/or utilization of strong cryptographic keys to secure portable storage devices in accordance with an aspect of the claimed subject matter.

FIG. 5 depicts a further aspect of the claimed subject matter 500 wherein two users A and B have joint possession of particular content (e.g., folders) on portable storage device 108. For the sake of brevity and to avoid unwarranted and unnecessary repetition, the description and functionality of components previously expounded upon have been omitted. As illustrated system 500 can include client 102, network topology 104, server 106, and portable storage device 108 associated with client 102 that has been previously encrypted, or portions (e.g., folders or directories) thereof have been encrypted, by users A and B. In this instance, where two or more users have encrypted portable storage device 108, all users must typically authenticate themselves to server 106 in order for device 108 or encrypted portions thereof to be decrypted. For example, where users A and B jointly have previously encrypted device 108, user A must successfully logon to server 106 so that one set of keys associated specifically with user A can be obtained, and within a predetermined time (e.g., 5 minutes) thereafter user B must also successfully logon to server 106 to obtain another set of keys associated specifically with user B so that device 108 can be successfully decrypted and the contents made available. It should be noted that in this aspect of the claimed subject matter, the device typically cannot be decrypted without the two sets of distinct symmetric cryptographic keys; obtaining only one set of keys, for example, user A's keys alone, generally will not decrypt and make device 108 accessible to either user A or user B.

In a further aspect of the claimed subject matter, and more particularly in relation with FIG. 5 and system 500 above, for example, secret sharing can be utilized wherein a key can be distributed amongst a group of individuals (e.g., users A and B), each of which can be allocated a share of the distributed key. The shared key can only be reconstructed when the shares are combined together; individual shares are of no utility on their own. Under this scheme server 106 can generate the set of keys as elucidated previously and distribute fractional parts of the generated set of keys to the group of individuals (e.g., users A and B) in such a way that only the entirety of group of individuals acting in concert can reconstruct the key, but no group fewer than the entirety can do so.

Figure 6:
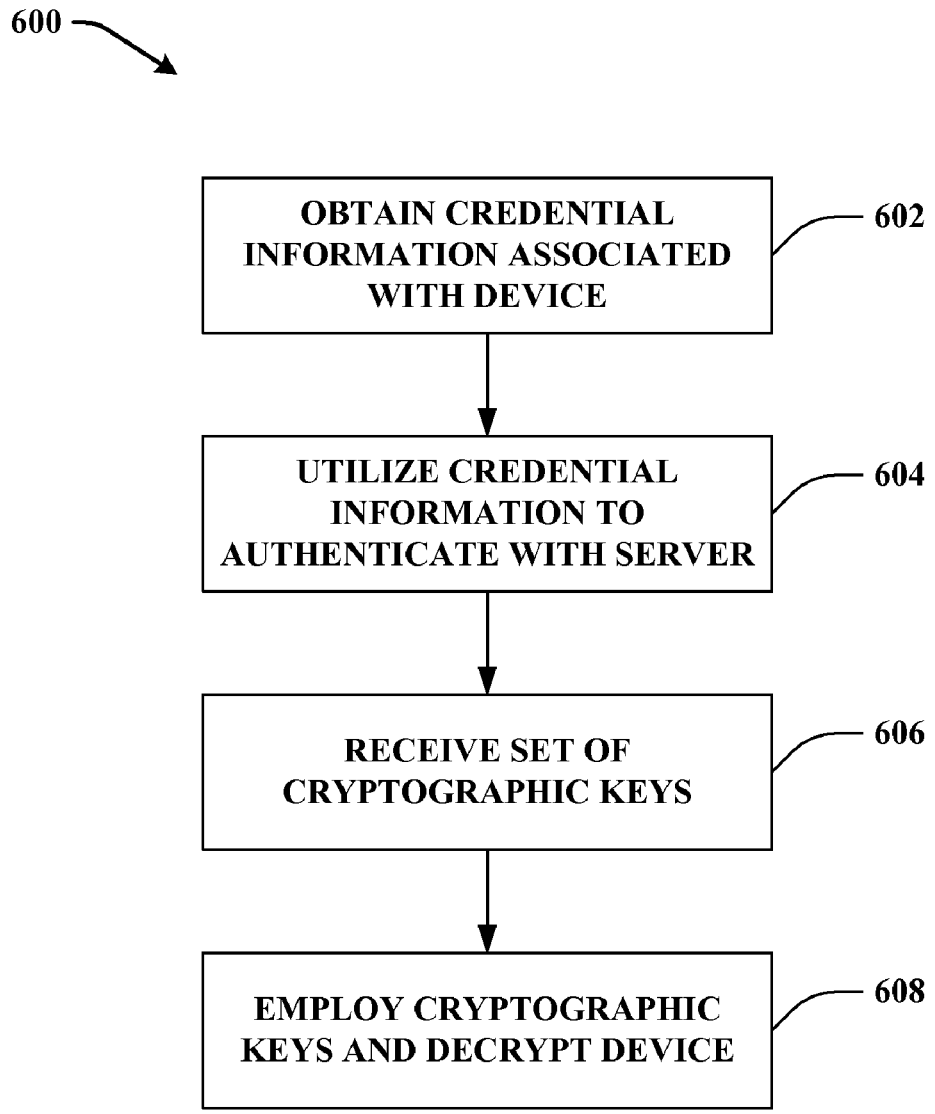
FIG. 6 illustrates a flow diagram of a machine implemented method that facilitates and effectuates generation and/or utilization of strong cryptographic keys to secure portable storage devices in accordance with an aspect of the subject matter as claimed.
Figure 7:
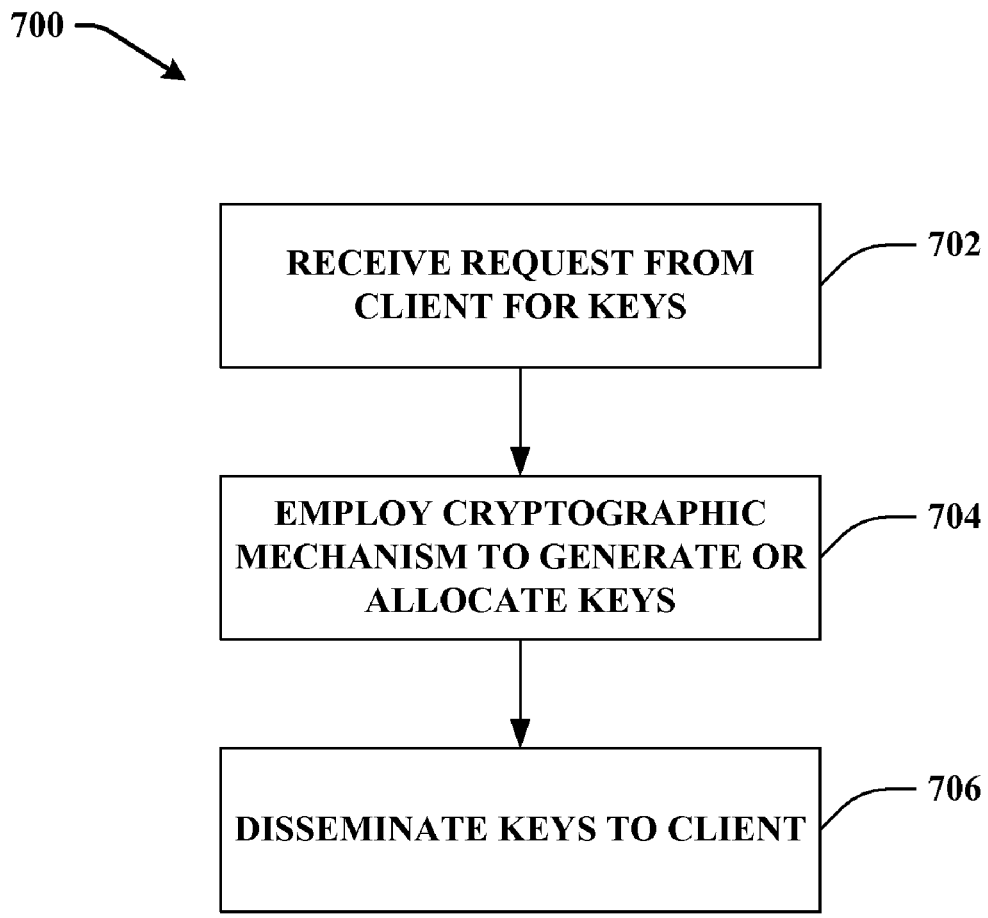
FIG. 7 provides further illustration of a flow diagram implemented on a machine that facilitates and effectuates generation and/or utilization of strong cryptographic keys to secure portable storage devices in accordance with an aspect of the subject matter as claimed.
Figure 8:
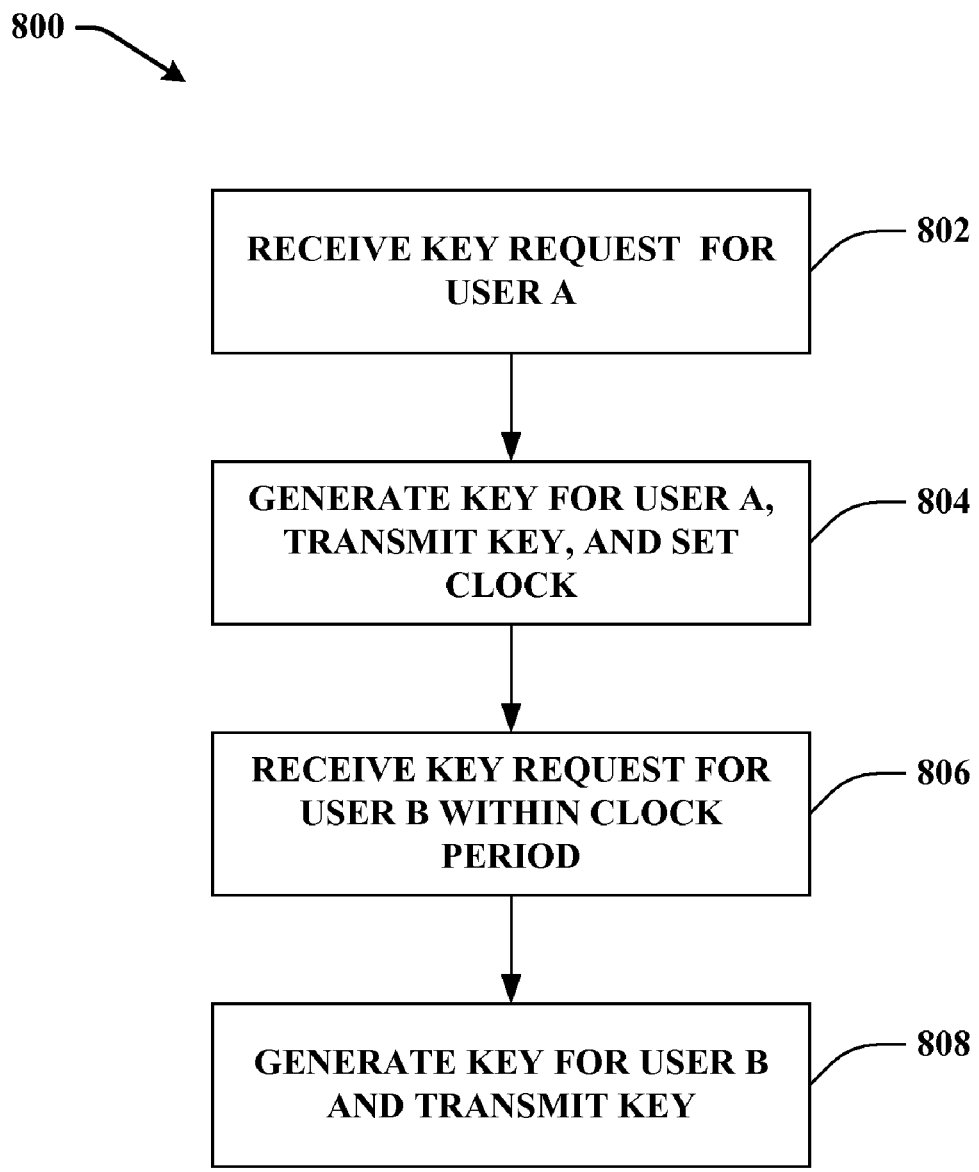
FIG. 8 depicts a flow diagram of a machine implemented method that facilitates and effectuates generation and/or utilization of strong cryptographic keys to secure portable storage devices in accordance with an aspect of the subject matter as claimed.

In view of the exemplary systems shown and described supra, methodologies that may be implemented in accordance with the disclosed subject matter will be better appreciated with reference to the flow charts of FIGS. 6-8. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

FIG. 6 provides a machine implemented methodology 600 that effectuates and facilitates generation and/or utilization of strong cryptographic keys to secure portable storage devices in accordance with an aspect of the claimed subject matter. Method 600 typically can find application on, and can be utilized by, client 102. At 602 the methodology upon discovering that a device (e.g., portable storage device 108) has been associated with client 102 can obtain or retrieve credential information associated with the device. For example, client 102 can locate a credential cache region (e.g., credential cache 402) situated on the newly discovered device and collect the information (e.g., username and password details) persisted thereon. At 604 the methodology can utilize the credential information to authenticate and commence communication with server 106. At 606 the method can receive a set of symmetric cryptographic keys generated by server 106 and distinct with respect to the credential information (e.g., distinct with respect to the device and the user associated with the device). At 608 the method can utilize the received set of cryptographic keys to decrypt the contents persisted on the device and make the contents available for use by the user.

FIG. 7 provides a further methodology 700 implemented on a machine, such as server 106, that effectuates and facilitates generation and/or utilization of strong cryptographic keys to secure portable storage devices in accordance with another aspect of the claimed subject matter. At 702 a request for a set of cryptographic keys can be received from client 102. At 704 the method can utilize one or more cryptographic tools and techniques to generate or allocate a set of symmetric cryptographic keys for use by client 102 to either decrypt or encrypt a device (e.g., portable storage device 108) of portions thereof. At 706 the method, having completed generation or allocation of a set of distinct symmetric cryptographic keys (e.g., unique with respect to the device and the user associated with the device), can transmit the keys to the client that requested the keys.

FIG. 8 depicts a methodology 800 that can be actuated on a machine, such as server 106, that facilitates and effectuates allocation and/or utilization of strong cryptographic keys to secure portable storage devices in accordance with another aspect of the claimed subject matter. At 802 the methodology can receive a key request from client 102 for user A (e.g., that a set of distinct symmetric cryptographic keys unique to user A be generate or allocated). Typically the request will include credential information (e.g., username and password) associated specifically with user A. At 804 the methodology can generate or allocate keys for user A, transmit these keys to the requesting client (e.g., client 102), and set a clock that can be used to determine a period within which a second user, user B, should provide further credential information (e.g., username and password specific to user B). At 806 the method can receive authenticating information from user B provided that the credential information is received within the time period allocated. Where information is received from B in the time-frame provided, at 808 a set of distinct symmetric cryptographic keys specific to user B can be generated or allocated and thereafter conveyed to the client at which point the keys associated with user A and user B can be used in combination to decrypt the contents persisted on the device and make the contents available for use by both user A and user B.

Figure 9:
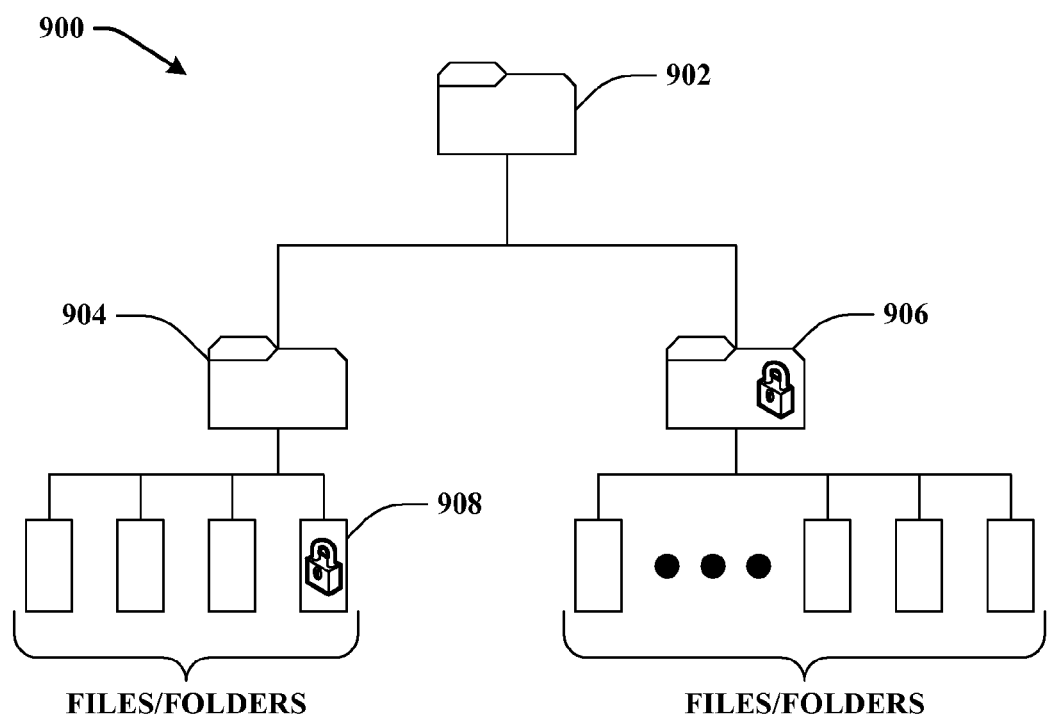
FIG. 9 provides depiction of an illustrative hierarchical directory structure that utilizes strong cryptographic keys to secure portions of the directory structure.

As exemplified in FIG. 9 and in accordance with an aspect of the subject matter as claimed, an illustrative hierarchy of folders/directories and files 900 is presented. The hierarchy 900 can include root folder/directory 902 that, in this instance, can be accessible by all comers (e.g., root folder/directory 902 has open access). Further, root folder/directory 902 can contain subfolders 904 and 906 respectively. As illustrated, subfolder 904, like root folder/directory 902, can have open access whereas subfolder 906 in accordance with the foregoing description as provided in relation to FIGS. 1-8 can be accessible only to a select few individuals as indicated by the illustrative lock icon depicted in subfolder/directory 906. Implicit in the depiction of subfolder/directory 906 is the fact that any files/folders that depend from subfolder/directory 906 typically will be inaccessible to parties who cannot acquire the keys necessary to gain access to subfolder/directory 906. Nevertheless, as will be appreciated by those conversant in the field of endeavor, the claimed subject matter is not necessarily so limited, as alternate modalities of partially encrypting or making folders/files selectively accessible or inaccessible can be employed and as such can be deemed to fall within the purview of the subject matter as claimed. Also as illustrated in FIG. 9, subfolder/directory 904 can have depending there from a plethora of files/folders, one of which (908) for the purposes of illustration rather than limitation, can be made selectively available and/or inaccessible based at least in part on the ability of a party to acquire the necessary keys to gain or deny access to file/folder 908.

It should be noted in connection with FIG. 9 that solely for the sake of ease of depiction that a lock icon has been employed to denote the status of a particular folder/subfolder/directory/subdirectory/file. As will be appreciated by those cognizant in this field of endeavor, other devices can be employed with equal utility without departing from the spirit, intent, or scope of the claimed subject matter. Illustrative devices can include associating images, audio/visual files, various colors, shading, ghosting, and the like, to folders/subfolders/directories/subdirectories/files subject to an aspect or aspects of the claimed subject matter. Moreover, various associated images, audio/visual files, various colors, shading, ghosting, etc., can be affiliated with unique and/or disparate keys. For example, subfolder/directory 906 can be associated with one cryptographic key and can be ghosted and/or colored pink, whereas file/folder 908 can be affiliated with a different cryptographic key and associated with a musical ring tone and/or an image. Additionally, folders/subfolders/directories/subdirectories/files confederated with a particular cryptographic key can be indicated in an identical or similar manner. For instance, in subfolder/directory 906 all files that depend from subfolder/directory 906 including subfolder/directory 906 can be hidden (e.g., only persons with keys to access a folder can view the details of the subfolder/directory) or ghosted and/or colored blue. Alternatively and/or additionally, only files that depend from subfolder/directory, excluding subfolder/directory 906 can be hidden, ghosted or colored blue, for example. As further example, if subfolder/directory 906 and file/folder 908 were encrypted through use of identical and/or similar keys, both subfolder/directory 906 and file/folder 908 can be similarly denoted or marked (e.g., associated with an image and/or a user chosen musical clip).

In accordance with a further illustrative aspect of the claimed subject matter, encrypted folders/subfolders/directories/subdirectories/files 906 and/or 908, or encrypted matter included therein, can be copied or moved between clients (e.g., client 102) without the necessity of one or more of the clients being in a trust relationship with each other or with server 106. In order to facilitate and effectuate such features Extensible Markup Language (XML) access control descriptors can be utilized, for example.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

As used in this application, the terms "component" and "system" are intended to refer to a computer-related entity, either hardware, a combination of hardware and software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
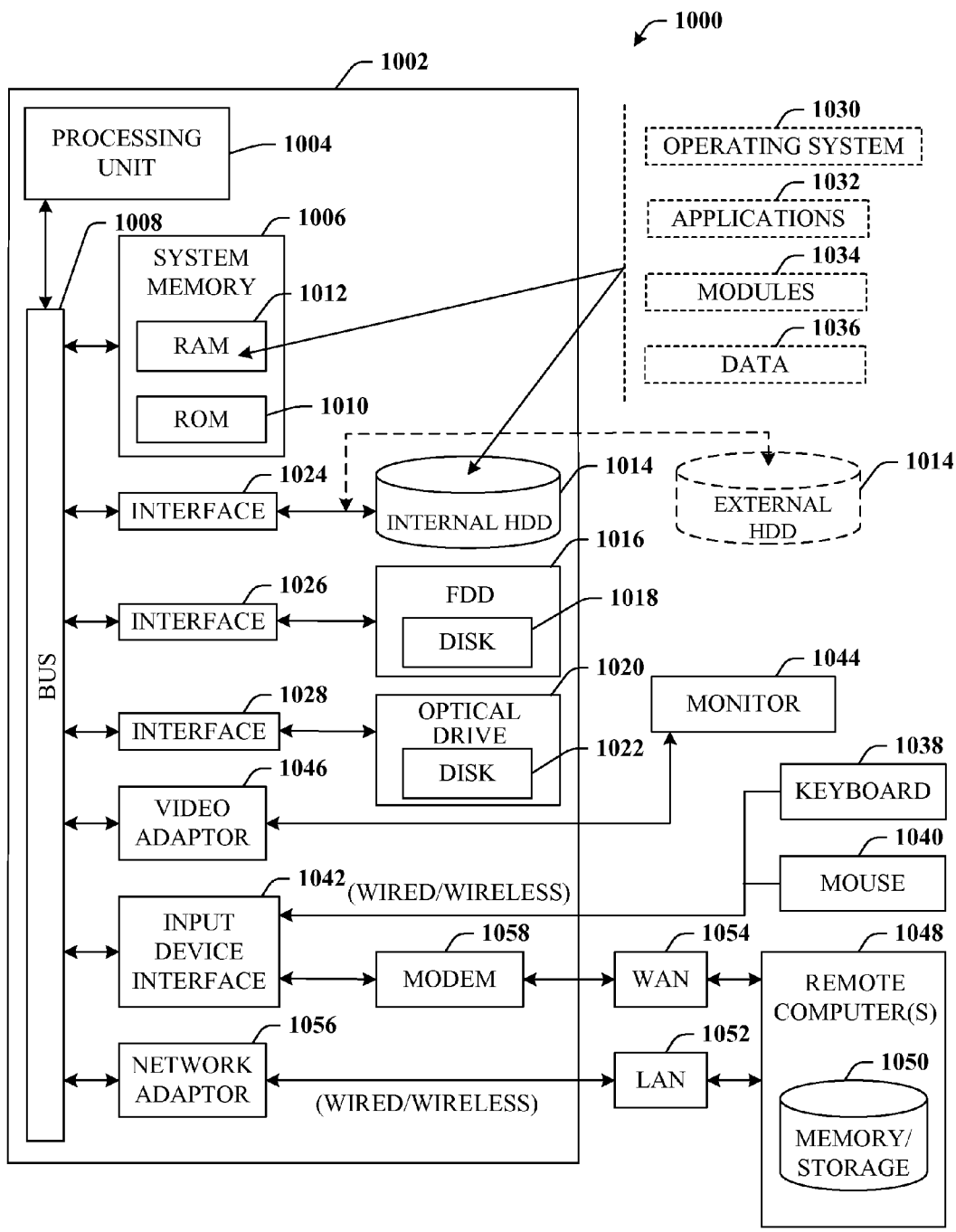
FIG. 10 illustrates a block diagram of a computer operable to execute the disclosed system in accordance with an aspect of the claimed subject matter.

Referring now to FIG. 10, there is illustrated a block diagram of a computer operable to execute the disclosed system. In order to provide additional context for various aspects thereof, FIG. 10 and the following discussion are intended to provide a brief, general description of a suitable computing environment 1000 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1094 interface technologies. Other external drive connection technologies are within contemplation of the claimed subject matter.

The drives and their associated computer-readable media provide nonvolatile storage of data, data structures, computer-executable instructions, and so forth. For the computer QUM02, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1012, including an operating system QUM30, one or more application programs 1032, other program modules 1034 and program data 1036. All or portions of the operating system, applications, modules, and/or data can also be cached in the RAM 1012. It is to be appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1094 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT wired Ethernet networks used in many offices.

Figure 11:
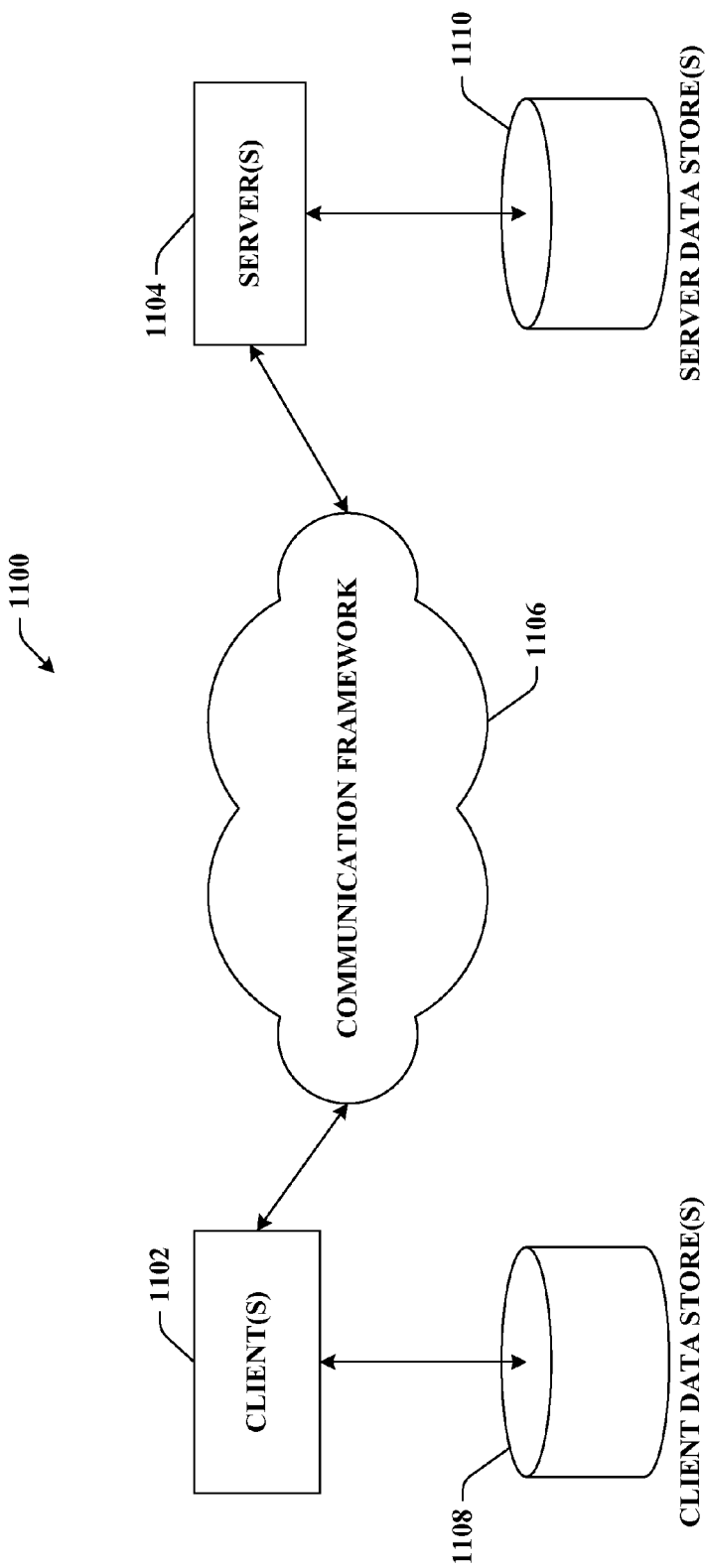
FIG. 11 illustrates a schematic block diagram of an exemplary computing environment for processing the disclosed architecture in accordance with another aspect.

Referring now to FIG. 11, there is illustrated a schematic block diagram of an exemplary computing environment 1100 for processing the disclosed architecture in accordance with another aspect. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A machine implemented system that facilitates and effectuates at least one of generation, allocation, or utilization of cryptographic keys to secure portable storage devices, comprising:
   one or more computer storage media having stored therein one or more computer executable components; and
   one or more processors that execute the one or more computer executable components, the one or more computer executable components comprising:
   a component that receives from an interface a notification that a device has been associated with the component, the component locates a credential cache affiliated with the device and extracts a previously established username and password combination, the previously established username and password combination utilized to initiate a communication with a server, the server employing the previously established username and password combination and generating and distributing a set of cryptographic keys related to the previously established username and password combination to the component, the component decrypts a content stored on the device with at least one key from the set of cryptographic keys, makes the content stored on the device available for use, and destroys the received set of cryptographic keys at the component after the content stored on the device is available for use,
   in an event that the content is accessible by two or more users, the component authenticates information of the two or more users, the server generating and distributing a distinct set of cryptographic keys to each user, the component requires all sets of cryptographic keys of the two or more users being available to the component within a predetermined time and decrypts the content stored on the device with at least one key from each set of cryptographic keys of the two or more users, any single set of cryptographic keys being unable to decrypt the content stored on the device.

2. The system of claim 1, wherein the server utilizes at least one of a block cipher, a stream cipher, or a hash function to generate the set of cryptographic keys related to the previously established user name and password combination.

3. The system of claim 1, wherein the component receives a notification that a previously unknown device has been associated with the component, the component instigates a user to establish an account on the server with a username and a password, the server generating and distributing to the component another set of cryptographic keys, at least one key from the another set of cryptographic keys utilized by the component to encrypt a content stored on the previously unknown device, the component includes the username and the password in a credential cache affiliated with the previously unknown device and removes the received another set of cryptographic keys from the component after the content stored on the previously unknown device is encrypted.

4. The system of claim 1, wherein the device includes a Universal Serial Bus (USB) storage device, a cell phone associated with a storage device, a digital camera that includes a memory, or a notebook computer and affiliated storage devices.

5. The system of claim 1, wherein the password included in the previously established username and password combination includes at least one of a click password or a password strengthened with a random string.

6. The system of claim 1, wherein a cardinality of the set of cryptographic keys related to the previously established username and password combination is adjusted on demand.

7. The system of claim 1, wherein the server disables an account associated with the previously established username and password combination after a threshold number of connection attempts has been exceeded.

8. The system of claim 1, wherein the set of cryptographic keys is a set of symmetric keys.

9. A method comprising:
   under control of one or more processors configured with computer-executable instructions:
   receiving from an interface a notification that a device has been associated;
   locating a credential cache affiliated with the device;
   extracting a previously established username and password combination from the credential cache;
   utilizing the previously established username and password combination to establish a communication with a server;
   receiving a set of cryptographic keys related to the previously established username and password combination from the server;
   decrypting a content stored on the device with at least one key from the set of cryptographic keys, the decrypting including:
   in an event that the content is accessible by two or more users,
   authenticating information of the two or more users;
   receiving from the server a distinct set of cryptographic keys to each user,
   requiring all set of cryptographic keys of the two or more users being available within a predetermined time; and
   decrypting the content stored on the device with at least one key from each set of cryptographic keys of the two or more users, any single set of cryptographic keys being unable to decrypt the content stored on the device;
   making the content stored on the device available for use; and
   destroying the received set of cryptographic keys after the content stored on the device is available for use.

10. The method of claim 9, wherein at least one of a block cipher, a stream cipher, or a hash function is used by the server to generate the set of cryptographic keys related to the previously established user name and password combination.

11. The method of claim 9, further comprising:
   receiving a notification that a previously unknown device has been associated;
   instigating a user to establish an account on the server with a username and a password,
   receiving another set of cryptographic keys from the server;
   utilizing at least one key from the another set of cryptographic keys to encrypt a content stored on the previously unknown device;
   including the username and the password in a credential cache affiliated with the previously unknown device; and
   removing the received another set of cryptographic keys after the content stored on the previously unknown device is encrypted.

12. The method of claim 9, wherein the device includes a Universal Serial Bus (USB) storage device, a cell phone associated with a storage device, a digital camera that includes a memory, or a notebook computer and affiliated storage devices.

13. The method of claim 9, wherein the password included in the previously established username and password combination includes at least one of a click password or a password strengthened with a random string.

14. The method of claim 9, wherein a cardinality of the set of cryptographic keys related to the previously established username and password combination is adjusted on demand.

15. One or more memories having stored therein computer executable instructions that, when executed by one or more processes, direct the one or more processors to perform actions comprising:
   receiving from an interface a notification that a device has been associated;
   locating a credential cache affiliated with the device;
   extracting a previously established username and password combination from the credential cache;
   utilizing the previously established username and password combination to establish a communication with a server;
   receiving a set of cryptographic keys related to the previously established username and password combination from the server;
   decrypting a content stored on the device with at least one key from the set of cryptographic keys, the decrypting including:
   in an event that the content is accessible by two or more users,
      authenticating information of the two or more users;
      receiving from the server a distinct set of cryptographic keys to each user,
      requiring all set of cryptographic keys of the two or more users being available within a predetermined time; and
      decrypting the content stored on the device with at least one key from each set of cryptographic keys of the two or more users, any single set of cryptographic keys being unable to decrypt the content stored on the device;
   making the content stored on the device available for use; and
   destroying the received set of cryptographic keys after the content stored on the device is available for use.

16. The one or more memories of claim 15, wherein at least one of a block cipher, a stream cipher, or a hash function is used by the server to generate the set of cryptographic keys related to the previously established user name and password combination.

17. The one or more memories of claim 15, wherein the actions further comprise:
   receiving a notification that a previously unknown device has been associated;
   instigating a user to establish an account on the server with a username and a password,
   receiving another set of cryptographic keys from the server;
   utilizing at least one key from the another set of cryptographic keys to encrypt a content stored on the previously unknown device;
   including the username and the password in a credential cache affiliated with the previously unknown device; and
   removing the received another set of cryptographic keys after the content stored on the previously unknown device is encrypted.

18. The one or more memories of claim 15, wherein the device includes a Universal Serial Bus (USB) storage device, a cell phone associated with a storage device, a digital camera that includes a memory, or a notebook computer and affiliated storage devices.

19. The one or more memories of claim 15, wherein the password included in the previously established username and password combination includes at least one of a click password or a password strengthened with a random string.

20. The one or more memories of claim 15, wherein a cardinality of the set of cryptographic keys related to the previously established username and password combination is adjusted on demand.

* * * * *